United States Patent
Pendakur

(10) Patent No.: US 8,751,681 B1
(45) Date of Patent: Jun. 10, 2014

(54) DELIVERING CONTENT BY ENCAPSULATING INTO PACKAGES WITH ASSOCIATED META-DATA

(75) Inventor: Ramesh Pendakur, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 4181 days.

(21) Appl. No.: 09/608,803

(22) Filed: Jun. 30, 2000

(51) Int. Cl.
*G06F 15/16* (2006.01)

(52) U.S. Cl.
USPC .......................................................... 709/236

(58) Field of Classification Search
USPC .......................... 708/236; 709/236, 231, 200
See application file for complete search history.

(56) References Cited

U.S. PATENT DOCUMENTS

| 5,862,325 | A * | 1/1999 | Reed et al. | 709/201 |
|---|---|---|---|---|
| 6,055,543 | A * | 4/2000 | Christensen et al. | 1/1 |
| 6,085,203 | A * | 7/2000 | Ahlers et al. | 715/523 |
| 6,202,099 | B1 * | 3/2001 | Gillies et al. | 709/317 |
| 6,477,580 | B1 * | 11/2002 | Bowman-Amuah | 709/231 |
| 2001/0047365 | A1 * | 11/2001 | Yonaitis | 707/200 |
| 2002/0194260 | A1 * | 12/2002 | Headley et al. | 709/203 |

FOREIGN PATENT DOCUMENTS

| DE | 199 33 584 | 1/2001 |
|---|---|---|
| EP | 1071219 | 1/2001 |
| WO | WO 99/39275 | 8/1999 |
| WO | WO 01/82110 | 11/2001 |

OTHER PUBLICATIONS

Liu, L. et al, "XWRAP: An XML-Enabled Wrapper Construction System For Web Information Sources", Data Engineering, 2000. Proceedings. 16*th* Intl Conference on San Diego, CA, USA Feb. 29-Mar. 3, 2000, Los Alamitos, CA, USA, IEEE Comput. Soc, US, Feb. 29, 2000, pp. 611-621.
Kunieda, T. et al, "Package-Segment Model for Movie Retrieval System and Adaptable Aplications", Multemedia Computing and Systems, 1999. IEEE Intl Conference on Florence, Italy Jun. 7-11, 1999, Los Alamitos, CA, USA, IEEE Comput. Soc, US, Jun. 7, 1999, pp. 944-948.

* cited by examiner

*Primary Examiner* — William Goodchild
(74) *Attorney, Agent, or Firm* — Blakely, Sokoloff, Taylor & Zafman LLP

(57) ABSTRACT

In one embodiment of the invention, a content is composed for delivery over a network to a subsystem. The content has a package containing a content. The package has package elements. The package and the package elements are tagged using meta-data. The meta-data are serialized into a file system compatible with the subsystem using a markup language.

30 Claims, 7 Drawing Sheets

DELIVERING CONTENT BY ENCAPSULATING INTO PACKAGES WITH ASSOCIATED META-DATA

BACKGROUND

1. Field of the Invention

This invention relates to networks. In particular, the invention relates to content delivery.

2. Description of Related Art

Information distribution over a network is becoming more and more popular. Users now can have access to thousands of network databases and content providers to retrieve news, articles, files, stock quotes, music files, video clips, etc. with ease. In many instances, content providers download data, news, and files to the subscribers automatically.

As demands for information access become higher and higher, it becomes economical to package the information contents for efficient delivery and discovery. However, the abundant supply of information has created several problems. The interests of users change over time, leading to difficulties in sorting out relevant information. The users' platforms or computer systems are constantly upgraded with new hardware and software, making presentation of information at the user's site less effective.

Existing packaging techniques merely bundle files into a .zip or .tar file. The content is usually compressed and integrated without any categorization or discrimination of information. These techniques provide no useful information about the content other than the names and sizes of the individual files.

Therefore, there is a need to have an efficient technique to package content for delivery.

BRIEF DESCRIPTION OF THE DRAWINGS

The features and advantages of the present invention will become apparent from the following detailed description of the present invention in which.

DESCRIPTION

The present invention is a technique to deliver content to a subsystem or node in a network. A package is composed for delivery to have package elements corresponding content of the packaged content. The package and the package elements are tagged using meta-data. The meta-data are then serialized and combined with the package elements into a serialized packaged content compatible with a receiving subsystem using a markup language.

The content is collected or gathered from several content sources. The content is encapsulated into packages with associated annotation and their respective meta-data information. The packages, once created, are used as units of distribution over the broadcast network.

A package is a logical grouping of media and other data files with associated meta-data about the content. A package is made up of package elements. Both the package and its package elements may have associated meta-data. Meta-data is defined as content or media descriptor tags that characterize the package elements and the package so that the corresponding content can be used in an intelligent manner within the broadcast network. The package elements may include HyperText Markup Language (HTML) pages, MP3 files, QuickTime movies, video clips, or any other suitable content. A package is independent of network and transmission mechanisms and policies. A package is represented in the file system with a unique identifier and package markup language data.

The meta-data assigned to the package and the package elements is unchanged in the system. In other words, the meta-data used at the sender and the receiver have the same meaning. The receiving subsystem may add additional meta-data, but the original meta-data as composed by the content originator with the delivered packaged content remains unchanged.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1A:
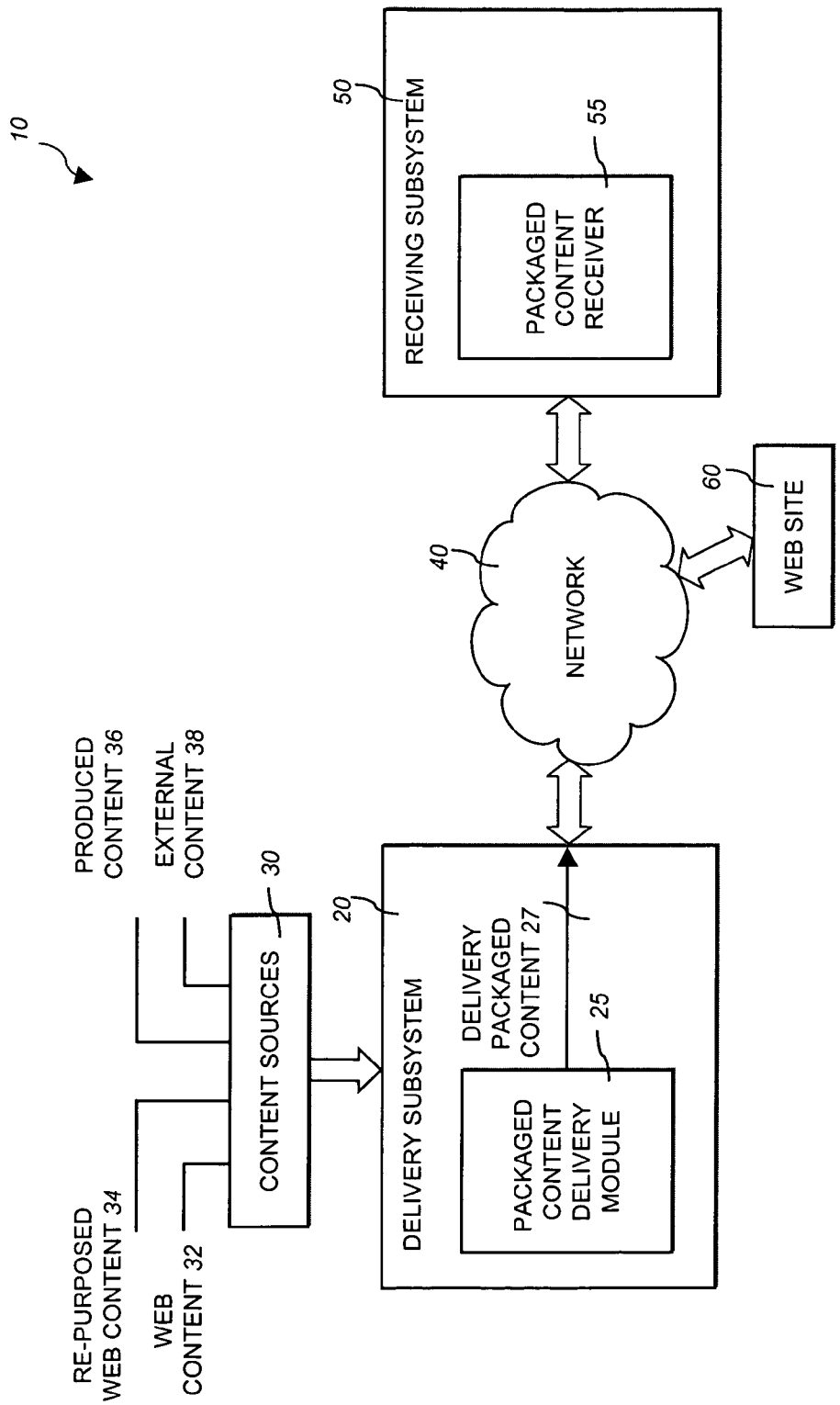
FIG. 1A is a diagram illustrating a system in which one embodiment of the invention can be practiced.

FIG. 1A is a diagram illustrating a system 10 in which one embodiment of the invention can be practiced. The system 10 includes a delivery subsystem or node 20, a plurality of content sources 30, a network 40, a receiving subsystem or node 50, and a web site 60.

Figure 1B:
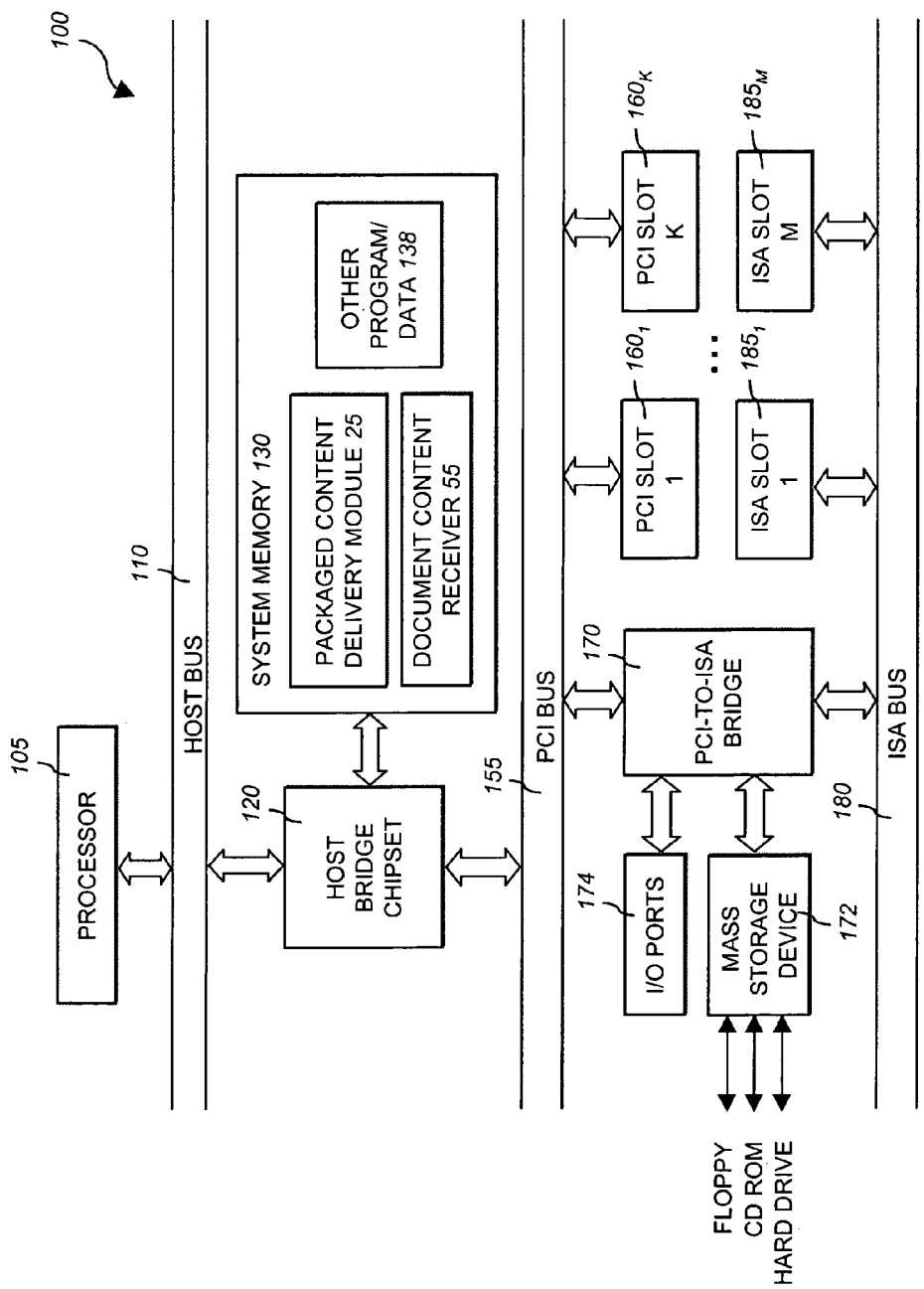
FIG. 1B is a diagram illustrating a computer system according to one embodiment of the present invention.

The delivery subsystem 20 provides the content to be delivered to other subsystems or nodes connected to the network 40. The delivery subsystem 20 may be a Web site, a content provider, an internet service provider (ISP), or any system that delivers, downloads, or broadcasts contents, packaged contents, data, and files over the network 40 to other subsystems or nodes. The delivery subsystem 20 may include a server, a computer system, or a platform with appropriate hardware and software to generate and prepare the packaged content to be delivered. One embodiment of the delivery subsystem is shown in FIG. 1B. The delivery subsystem 20 includes a packaged content delivery module 25 to delivers a packaged content 27 containing the content to be delivered.

The content sources 30 include the sources that provide the content of the packaged content to be delivered by the delivery subsystem 20. These sources may include Web content 32, re-purposed Web content 34, produced content 36, and external content 38. The Web content 32 may include Web pages and files retrieved from a Web site such as the Web site 60. The re-purposed Web content 34 may include previously retrieved Web pages and files. The produced content 36 may include content that has been created, generated, composed, or produced for delivery. The external content 38 may include any other external content produced elsewhere or stored in the subsystem 20.

The network 40 provides interconnections to the delivery subsystem 20, the receiving subsystem 50, the Web site 60, and other nodes or subsystems. The network 40 may correspond to any topologies and protocols. Some examples are Internet, Local Area Network, Wide Area Network, broadcast network, etc. The transmission medium may be any suitable communication medium such as air, cable, electromagnetic, optic, etc.

The receiving subsystem 50 receives the packaged content delivered by the delivery subsystem 20. The receiving subsystem 50 may be similar to the delivery subsystem 50 and may include a server, a computer system, and a platform. An embodiment of the receiving subsystem 50 is illustrated in FIG. 1B. The receiving subsystem 50 includes a packaged content receiver 55 that performs the receiving function. The receiving subsystem 50 provides interface to a user to use the received packaged content efficiently and intelligently.

The Web site 60 provides accesses to information, content, data, and files for downloading and capturing. The Web site 60 may be a source to provide the content to the delivery subsystem 20.

FIG. 1B is a diagram illustrating a computer system 100 according to one embodiment of the present invention. The computer system 100 may be used as part of the delivery subsystem 20 or the receiver subsystem 50. The computer system 100 includes a processor 105, a host bus 110, a host bridge chipset 120, a system memory 130, a peripheral component interconnect (PCI) bus 155, K PCI slots $160_1$ to $160_K$, a PCI-to-industry standard adapter (ISA) bridge 170, mass storage devices 172, Input/Output (I/O) ports 174, an ISA bus 180, and ISA slots $185_1$ to $185_M$.

The processor 105 represents a central processing unit of any type of architecture, such as complex instruction set computers (CISC), reduced instruction set computers (RISC), very long instruction word (VLIW), or hybrid architecture. The processor 105 interfaces with the host bridge chipset 120 via the host bus 110. The host bus 110 may support single processor or multiple processors.

The host bridge chipset 120 includes a number of interface circuits to allow the host processor 105 access to the system memory 130 and the PCI bus 155. The system memory 130 represents one or more mechanisms for storing information. For example, the system memory 130 may include non-volatile or volatile memories. Examples of these memories include flash memory, read only memory (ROM), or random access memory (RAM). The system memory 130 may contain the packaged content delivery module 25 or the packaged content receiver 55 (FIG. 1A), and other programs and data 138. Of course, the system memory 130 preferably contains additional software (not shown), which is not necessary to understanding the invention.

The PCI slots $160_1$ to $160_K$ provide interfaces to PCI devices. Examples of PCI devices include the network interface and the media interface. The network interface connects to communication networks such as the Internet. The Internet provides access to on-line service providers, Web browsers, and other network channels. The media interface provides access to audio and video devices.

The PCI-to-ISA bridge 170 provides access to the ISA bus 180, mass storage devices 172, and I/O ports 174. The mass storage devices 172 include CD-ROM, floppy diskettes, and hard drives. The ISA bus 180 has a number of ISA slots $185_1$ to $185_M$ to interface to ISA devices. Examples of ISA devices include data entry devices (e.g., keyboard, mouse), printers, etc.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information such as the mass storage devices 172. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The packaged content delivery module 25 or the packaged content receiver 55 may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Figure 2:
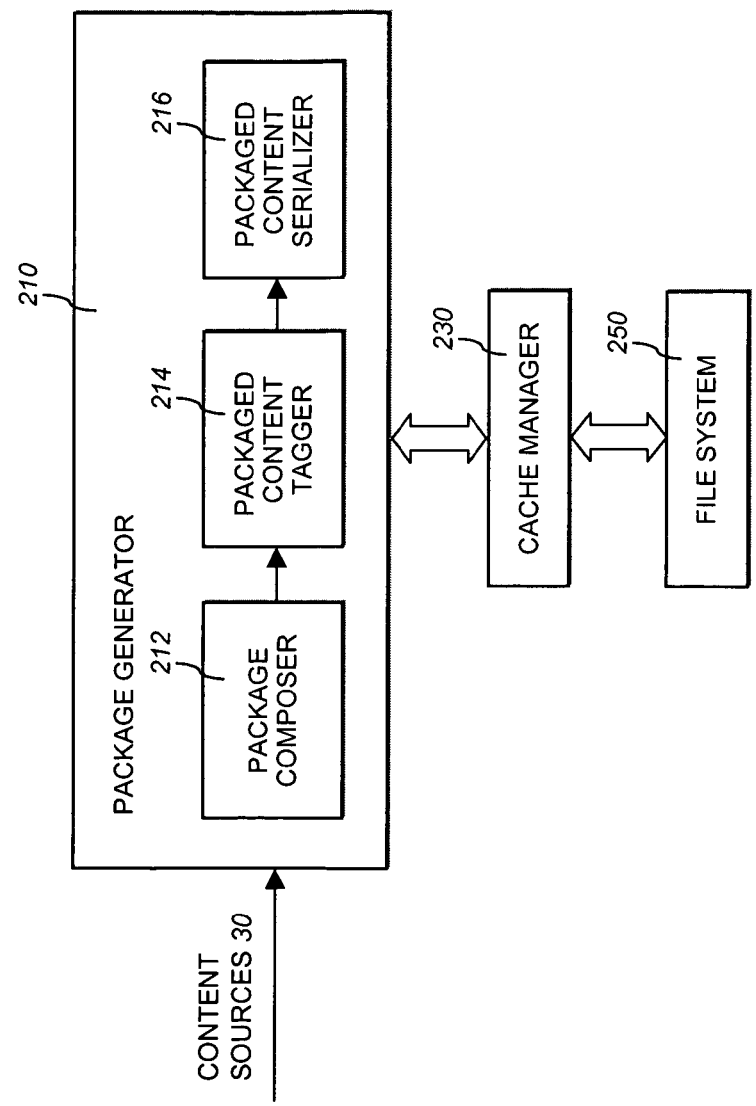
FIG. 2 is a diagram illustrating a packaged content delivery according to one embodiment of the invention.

FIG. 2 is a diagram illustrating the packaged content delivery module 25 shown in FIG. 1A according to one embodiment of the invention. The packaged content delivery module 25 includes a package generator 210, a cache manager 230, and a native file system 250. The packaged content delivery module 25 may be implemented by hardware, software, or a combination of both hardware and software.

The package generator 210 collects the content from the content sources 30 and generates the packaged content 27 for delivery to the receiving subsystem 50 (FIG. 1A). The package generator 210 includes a package composer 212, a packaged content tagger 214, and a packaged content serializer 216. The package composer 212 composes a package from the collected content. The packaged content tagger 214 tags the package and its package elements with meta-data, which describes or characterizes the corresponding package elements and the package. The packaged content serializer 216 produced the packaged content ready for delivery with appropriate markup language.

The cache manager 230 manages cache memories of the platform on which the package generator 210 operates. The cache manager 230 provides storage mechanism for the content and the meta-data used by the package generator 210. The file system 250 provides an environment to organize data, content, files into an hierarchical file organization. The file system 250 provides directories, subdirectories and other file facilities to facilitate the file management.

Figure 3:
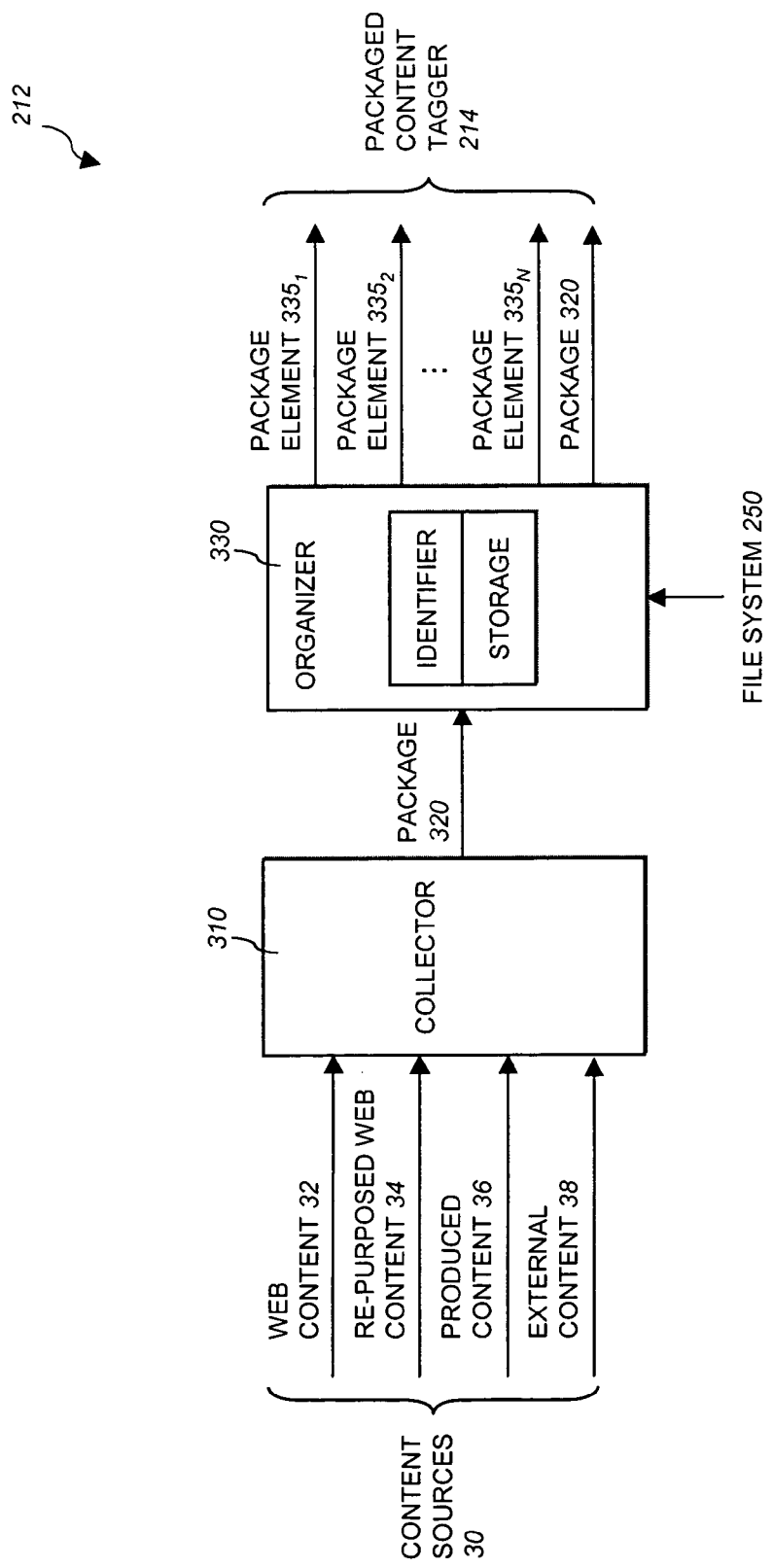
FIG. 3 is a diagram illustrating a package composer shown in FIG. 2 according to one embodiment of the invention.

FIG. 3 is a diagram illustrating the package composer 212 shown in FIG. 2 according to one embodiment of the invention. The package composer 212 includes a collector 310, and an organizer 330.

The collector 310 collects or gathers the content from the content sources 30 into a post-production site to create a package 320. The content sources 30 may include the Web content 32, the re-purposed Web content 34, the produced content 36, and other external content sources 38. The content may include HyperText Markup Language (HTML) pages, MP3 files, QuickTime movies, video clips, or any other suitable content. Any content source or provider may act as a content originator or a content aggregator depending on the exact nature of the business models and alliances with other content sources.

The organizer 330 organizes the collected content into N package elements $335_1$ to $335_N$ for the package 320. Each package element $335_k$ corresponds to a content type. For example, the package element $335_1$ may correspond to an MP3 file, the package element $335_2$ may correspond to an HTML page, the package element $335_3$ may correspond to another HTML page, etc. The organizer 330 provides a unique identifier to each of the package elements $335_1$ to $335_N$. The organizer 330 also interacts with the file system 250 (FIG. 2) to store the package elements into a set of files or directories/subdirectories that contain audio, video, data, script, executables, and other content types.

Figure 4:
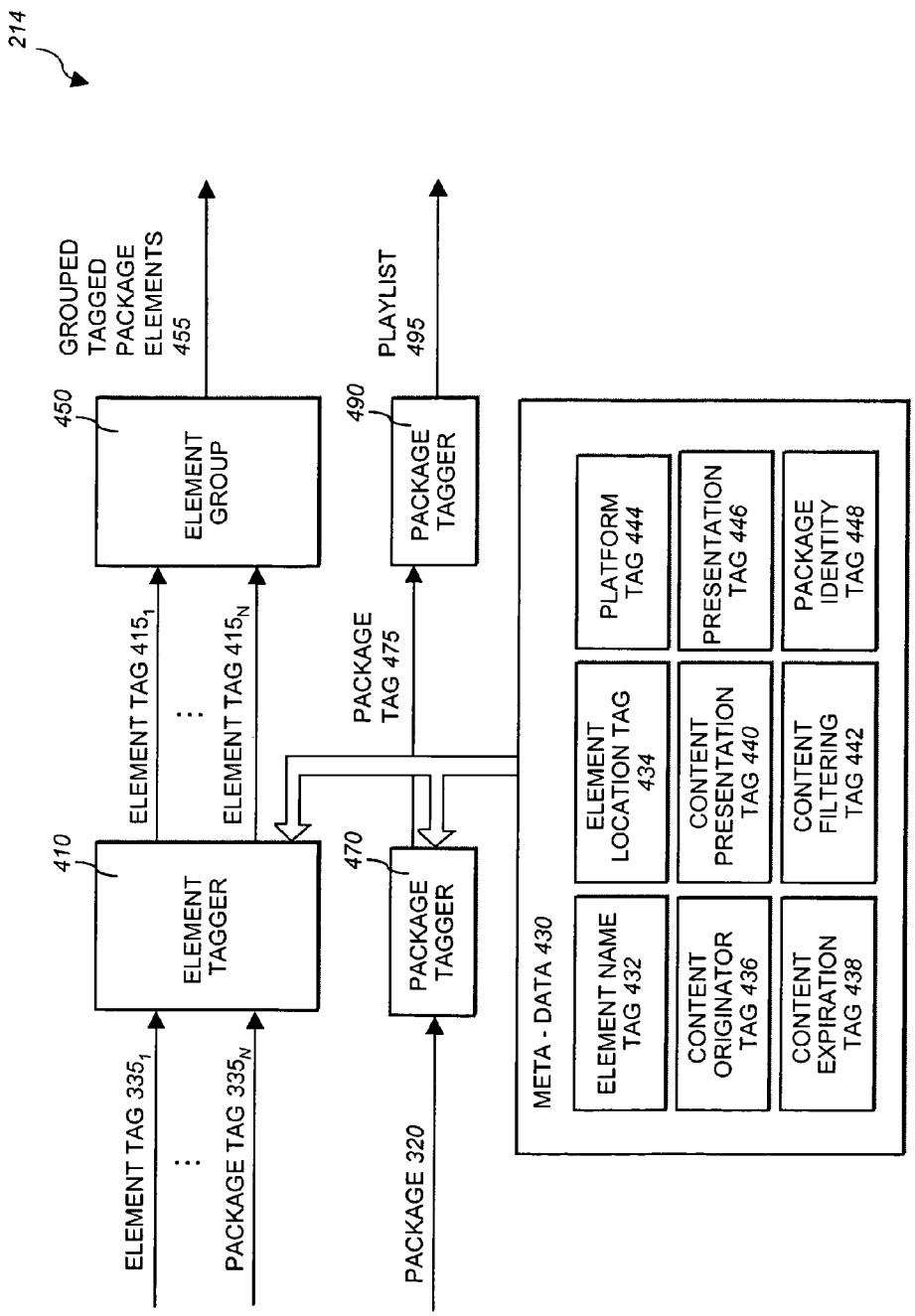
FIG. 4 is a diagram illustrating a packaged content tagger shown in FIG. 2 according to one embodiment of the invention.

FIG. 4 is a diagram illustrating the packaged content tagger 214 shown in FIG. 2 according to one embodiment of the invention. The packaged content tagger 214 includes an element tagger 410, a package element grouper 450, a package tagger 470, a meta-data 430, and a package marker 490.

The element tagger 410 and the package tagger 470 interface with the meta-data 430 to obtain tags that characterize the package elements $335_1$ to $335_N$ and the package 320. The element tagger 410 assigns a tag from the meta-data 430 to each of the package elements.

The meta-data 430 includes tags or descriptors for the package elements and the package 320. The tags for the package elements include an element name tag 432, an element location tag 434, a content originator tag 436, a content expiration tag 438, a content presentation tag 440, a content filtering tag 442, a platform tag 444, and a personalization tag 446. The tags for the package 320 include a package identity tag 448. The element name tag 432 is the name of the package element. The element location tag 434 indicates the location of the package element within the package according to some pre-defined location protocol. For example, the element location tag 434 may be an absolute address, a relative address, or a pointer to the corresponding package element. The content originator tag 436 provides information about the content provider that provides the content corresponding to the package element. The information may include the identifier, URL, and content type. The content expiration tag 438 indicates the content lifetime within the network. The content presentation tag 440 is used by the presentation engine in the receiver subsystem for rendering the end-user experience. The content filtering tag 442 indicates how the content should be categorized for filtering. The content filtering tag 442 may be used by heuristics that range from simple matching to correlation matching. The platform tag 444 is used to tailor the package element to specific platform capabilities. The content personalization tag 446 is used to personalize the content filtering and presentation to personal preferences for users on the receiver subsystem. The package identity tag 448 indicates the package identifier and/or the package element identifiers.

The package element grouper 450 groups the tagged package elements into logical groups based on some pre-defined criteria. For example, package elements having the same tags may be grouped together. The package element grouper 450 generates grouped tagged package elements 455.

The package tagger 470 tags the package 320 with the corresponding package tags. The package marker 490 marks the tagged package for inclusion in a playlist 495 that becomes part of the packaged content to be delivered.

Figure 5:
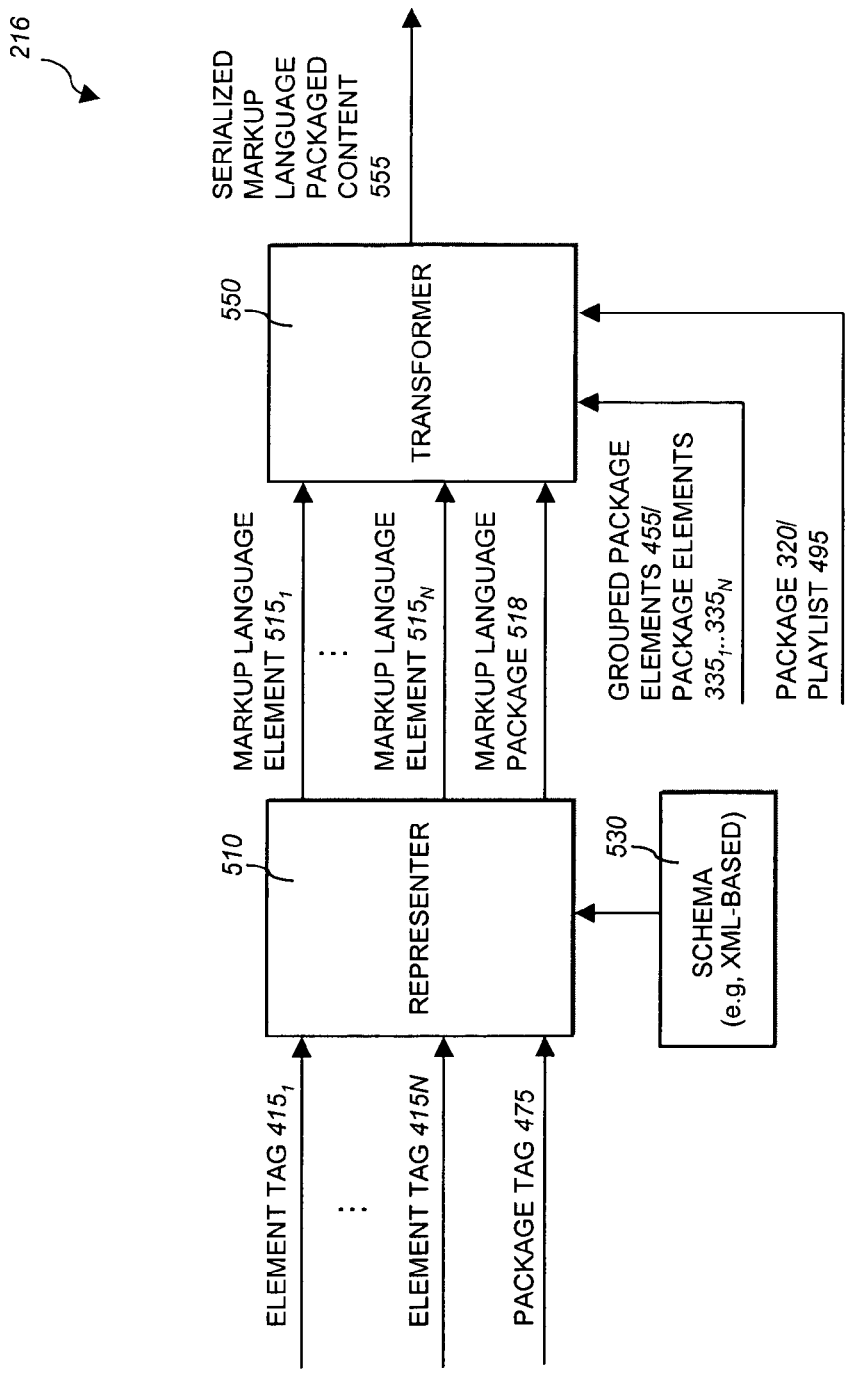
FIG. 5 is a diagram illustrating a packaged content serializer shown in FIG. 2 according to one embodiment of the invention.

FIG. 5 is a diagram illustrating the packaged content serializer 216 shown in FIG. 2 according to one embodiment of the invention. The packaged content serializer 216 includes a representer 510, a schema 530, and a transformer 550.

The representer 510 represents the element tags and the package tag for the package 320 using the schema 530. The schema 530 provides a framework for the representation. Typically, the schema 530 follows some universal standard or protocol so that the delivery packaged content becomes independent of the network and the transmission medium mechanisms and policies. In one embodiment, the schema 530 is based on the extensible markup language (XML). The representer 510 generates markup language elements $515_1$ to $515_N$ and markup language package 518 corresponding to the element tags $415_1$ to $415_N$ and the package tag 475, respectively.

The transformer 550 combines the markup language elements $515_1$ to $515_N$, the markup language package 518 and the package 320 or the playlist 495 with all the package elements $335_1$ to $335_N$ and transform into a serialized package markup language packaged content 555. The serialized package markup language packaged content 555 becomes the delivery packaged content 27 (FIG. 1) to be delivered to the receiving subsystem 50. The delivery packaged content 27 is also compatible with the file system 250 (FIG. 2) which is compatible with the file system of the receiver subsystem 50.

Figure 6:
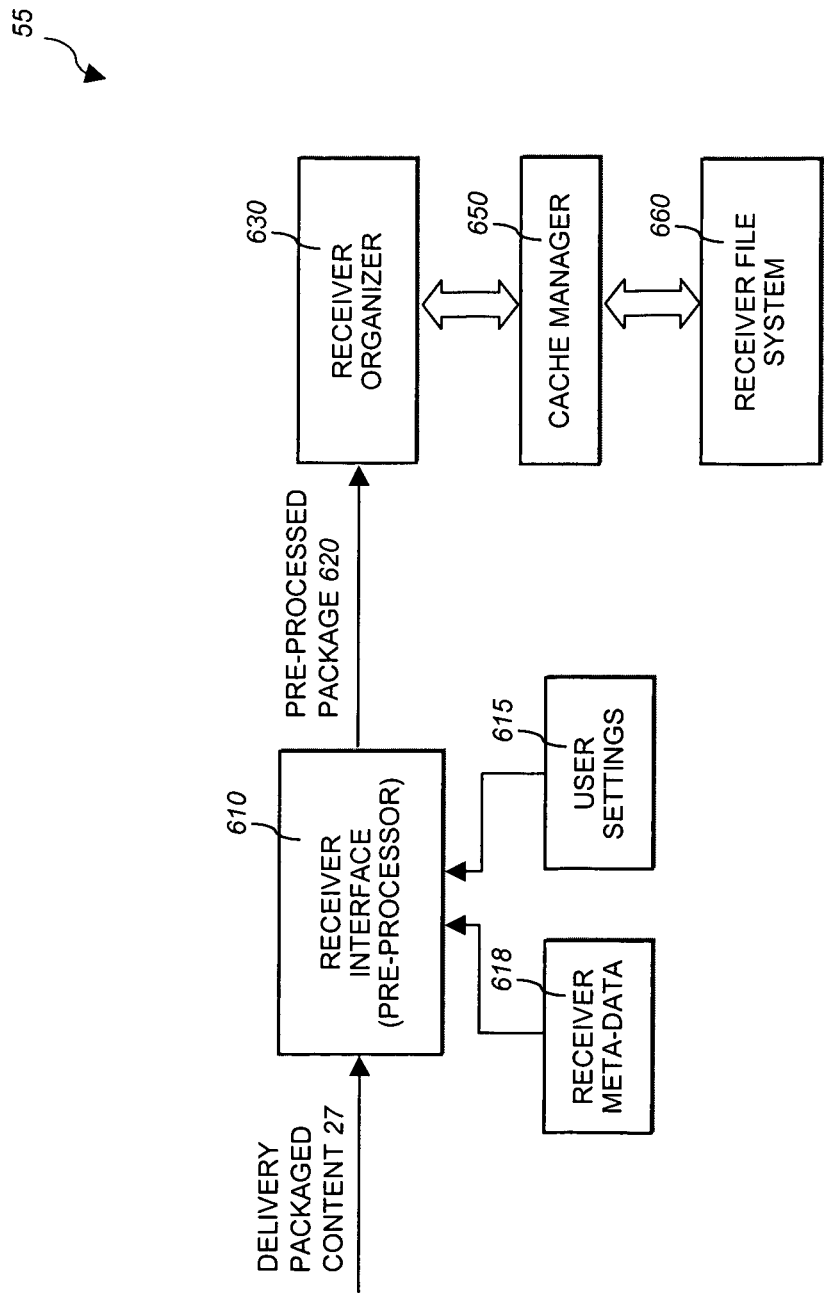
FIG. 6 is a diagram illustrating a packaged content receiver shown in FIG. 1 according to one embodiment of the invention.

FIG. 6 is a diagram illustrating the packaged content receiver 55 shown in FIG. 1 according to one embodiment of the invention. The packaged content receiver 55 includes a receiver interface 610, a receiver meta-data 618, user's settings 615, a receiver organizer 630 a cache manager 650, and a receiver file system 660.

The receiver interface 610 receives the delivery packaged content 27 and parses the delivery packaged content 27 according to some pre-defined preferences such as receiver user's settings 615. The receiver interface 610 may also tags the delivery packaged content 27 with the receiver meta-data 618. The receiver interface 610 then generates a pre-processed package 620 having content modified according to the receiver user's settings 615. For example, the receiver interface 610 may retain the package elements that have the filtering tags matching the user's filtering criteria set at the receiver subsystem 50. As another example, the receiver interface 610 may discard the package elements that have the expiration tags (e.g., obsolete news articles) exceeding the limit set by the receiver user.

The receiver organizer 630 organizes the pre-processed package 620 according to the receiver file system 660. The cache manager 650 manages cache memories of the platform on which the receiver organizer 630 operates. The cache manager 650 provides storage mechanism for the organized package. The receiver organizer 630 also uses the tagged receiver meta-data when organizing the packaged content. By sorting out the packaged content according to well-defined criteria and settings, the packaged content receiver 55 allows the receiver user to access the packaged content in an intelligent manner, personalized to user's preferences and criteria.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    composing a packaged content for delivery over a network to a subsystem, the packaged content having a package containing content, the package having package elements;
    tagging the package and the package elements using meta-data, wherein each package element corresponds to a content type, and wherein tagging includes interfacing with the meta-data to obtain first tags that characterize the package and second tags that characterize the package elements, the second tags including location tags to indicate locations of package elements within the package according to a pre-defined location protocol, wherein tagging further includes filter tagging for filtering the content for categorizing of the content, wherein filtering is based on simple matching or correlation matching or platform tagging for tailoring the package elements to match specific platform capabilities, wherein tagging further comprises at least one of assigning an element tag to each of the package elements, grouping the package elements according to corresponding element tags, assigning a package tag to a package based on the grouped package elements, and marking the package for inclusion into a playlist, wherein the package tag and the element tag form the meta-data, wherein tagging further comprises assigning a content expiration tag for indicating a lifetime of contents within a network; and serializing the meta-data into a file system compatible with the subsystem using a markup language.

2. The method of claim 1, wherein composing comprises:
collecting the content for the package elements from a plurality of content sources; and
organizing the package elements into a set of files.

3. The method of claim 2, wherein the content source is one of web content, re-purposed web content, produced content, and external content.

4. The method of claim 3, wherein the content source is one of a video, a data, a script, and an executable content.

5. The method of claim 2, wherein organizing comprises:
providing a unique identifier to each of the package elements; and
storing the package elements in the file system corresponding to the set of files.

6. The method of claim 1, wherein tagging further comprises assigning one or more of an element location tag for indicating a location of each package element according to a pre-define location protocol, an element name tag relating to a name of each package element, a content originator tag for providing information relating to the content provider that provides contents relating to the package elements, a content presentation tag for rendering user experiences, a content filtering tag for filtering the content for categorizing of the content, a platform tag for tailoring the package elements to match the specific platform capabilities, a personalization tag for personalizing the content filtering and presentation for users, and a package identity tag for indicating package identifiers or package element identifiers.

7. The method of claim 1, wherein serializing comprises:
representing the meta-data using a schema based on the markup language; and
transforming the represented meta-data and the package into the packaged content corresponding to the file system.

8. The method of claim 7, wherein representing the meta-data comprises:
representing the meta-data using an extensible markup language (XML) schema.

9. The method of claim 1, wherein the content type comprises an MP3 file or a HyperText Markup Language (HTML) page.

10. The method of claim 1, wherein a first tag comprises a package identity tags.

11. The method of claim 1, wherein a second tag further comprises one or more of an element name tag, a content originator tag, a content expiration tag, a content presentation tag, a content filtering tag, a platform tag, and a personalization tag.

12. The method of claim 1, wherein the packaged content delivered over the network from the subsystem is processed, the packaged content having the package associated with the meta-data using the markup language, the package having the package elements corresponding to the content, wherein the subsystem includes a delivery subsystem; and
wherein facilitating the processed packaged content is organized according to a receiver file system.

13. A non-transitory machine-readable medium having computer program code embedded therein, the computer program code to perform one or more operations comprising:
composing a packaged content for delivery over a network to a subsystem, the packaged content having a package containing content, the package having package elements;
tagging the package and the package elements using meta-data, wherein each package element corresponds to a content type, and wherein tagging includes interfacing with the meta-data to obtain first tags that characterize the package and second tags that characterize the package elements, the second tags including location tags to indicate locations of package elements within the package according to a pre-defined location protocol, wherein tagging further includes filter tagging for filtering the content for categorizing of the content, wherein filtering is based on simple matching or correlation matching or platform tagging for tailoring the package elements to match specific platform capabilities, wherein tagging further comprises at least one of assigning an element tag to each of the package elements, grouping the package elements according to corresponding element tags, assigning a package tag to a package based on the grouped package elements, and marking the package for inclusion into a playlist, wherein the package tag and the element tag form the meta-data, wherein tagging further comprises assigning a content expiration tag for indicating a lifetime of contents within a network; and
serializing the meta-data into a file system compatible with the subsystem using a markup language.

14. The non-transitory machine-readable medium of claim 13, wherein composing comprises:
collecting the content for the package elements from a plurality of content sources; and
organizing the package elements into a set of files.

15. The non-transitory machine-readable medium of claim 14, wherein the content source comprises at least one of web content, re-purposed web content, produced content, and external content.

16. The non-transitory machine-readable medium of claim 15, wherein the content source comprises at least one of a video, a data, a script, and an executable content.

17. The non-transitory machine-readable medium of claim 14, wherein organizing comprises:
providing a unique identifier to each of the package elements; and
storing the package elements in the file system corresponding to the set of files.

18. The non-transitory machine-readable medium of claim 13, wherein tagging further comprises assigning one or more of an element location tag for indicating a location of each package element according to a pre-define location protocol, an element name tag relating to a name of each package element, a content originator tag for providing information relating to the content provider that provides contents relating to the package elements, a content presentation tag for rendering user experiences, a content filtering tag for filtering the content for categorizing of the content, a platform tag for tailoring the package elements to match the specific platform capabilities, and a personalization tag for personalizing the content filtering and presentation for users, and a package identity tag for indicating package identifiers or package element identifiers.

19. The non-transitory machine-readable medium of claim 13, wherein serializing comprises:
   representing the meta-data using a schema based on the markup language; and
   transforming the represented meta-data and the package into the packaged content corresponding to the file system.

20. The non-transitory machine-readable medium of claim 19, wherein representing comprises:
   computer readable program code to represent the meta-data using an extensible markup language (XML) schema.

21. The non-transitory machine-readable medium of claim 13, wherein the packaged content delivered over the network from the subsystem is processed, the packaged content having the package associated with the meta-data using the markup language, the package having the package elements corresponding to the content, wherein the subsystem includes a delivery subsystem; and
   wherein facilitating the processed packaged content is organized according to a receiver file system.

22. A system comprising:
   a file system;
   a cache manager coupled to the file system to manage a cache memory; and
   a packaged content delivery module coupled to the cache manager to deliver a packaged content to a subsystem over a network, the packaged content delivery module comprising:
   a composer to compose the packaged content, the packaged content having a package containing content, the packaging having package elements,
   a tagger coupled to the composer to tag the package and the package elements using meta-data, wherein each package element corresponds to a content type, and wherein tagging includes interfacing with the meta-data to obtain first tags that characterize the package and second tags that characterize the package elements, the second tags including location tags to indicate locations of package elements within the package according to a pre-defined location protocol, wherein tagging further includes filter tagging for filtering the content for categorizing of the content, wherein filtering is based on simple matching or correlation matching or platform tagging for tailoring the package elements to match specific platform capabilities,
   wherein tagging further comprises at least one of assigning an element tag to each of the package elements, grouping the package elements according to corresponding element tags, assigning a package tag to a package based on the grouped package elements, and marking the package for inclusion into a playlist, wherein the package tag and the element tag form the meta-data, wherein tagging further comprises assigning a content expiration tag for indicating a lifetime of contents within a network, and
   a serializer coupled to the tagger to serialize the meta-data into the file system compatible with the subsystem using a markup language.

23. The system of claim 22, wherein the composer comprises:
   a collector to collect the content for the package elements from a plurality of content sources; and
   an organizer coupled to the collector to organize the package elements into a set of files.

24. The system of claim 23, wherein the content source is one of web content, re-purposed web content, produced content, and external content.

25. The system of claim 24, wherein the content source is one of a video, a data, a script, and an executable content.

26. The system of claim 23, wherein the organizer provides a unique identifier to each of the package elements; and stores the package elements in the file system corresponding to the set of files.

27. The system of claim 22, wherein tagging further comprises assigning one or more of an element location tag to indicate a location of each package element according to a pre-define location protocol, an element name tag relating to a name of each package element, a content originator tag to provide information relating to the content provider that provides contents relating to the package elements, a content presentation tag to render user experiences, a content filtering tag to filter the content for categorizing of the content, a platform tag to tailor the package elements to match the specific platform capabilities, and a personalization tag to personalize the content filtering and presentation for users, and a package identity tag to indicate package identifiers or package element identifiers.

28. The system of claim 22, wherein the serializer comprises:
   a representer to represent the meta-data using a schema based on the markup language; and
   a transformer coupled to the representer to transform the represented meta-data and the package into the packaged content corresponding to the file system.

29. The system of claim 28, wherein the representer comprises:
   a extensible markup language (XML) representer to represent the meta-data using an XML schema.

30. The system of claim 22, wherein the packaged content delivered over the network from the subsystem is processed, the packaged content having the package associated with the meta-data using the markup language, the package having the package elements corresponding to the content, wherein the subsystem includes a delivery subsystem; and
   wherein facilitating the processed packaged content is organized according to a receiver file system.

* * * * *